United States Patent [19]

Tomoda et al.

[11] Patent Number: 5,197,051
[45] Date of Patent: Mar. 23, 1993

[54] DEVICE FOR SPECIFYING AND CALCULATING A PLAY TIME OF AN OPTICAL DISK PLAYER

[75] Inventors: Haruhisa Tomoda, Neyagawa; Yasuomi Shimada, Katano, both of Japan

[73] Assignee: Matsushita Electric Industrial Co., Ltd., Kadoma, Japan

[21] Appl. No.: 800,897

[22] Filed: Nov. 26, 1991

Related U.S. Application Data

[63] Continuation of Ser. No. 128,912, Dec. 4, 1987, abandoned.

[30] Foreign Application Priority Data

Jan. 20, 1987 [JP] Japan .................................. 62-10604

[51] Int. Cl.$^5$ ...................... G11B 13/00; G11B 13/04; G11B 11/12; G11B 7/28
[52] U.S. Cl. ........................................ 369/14; 369/84; 369/85; 360/15
[58] Field of Search ................... 369/14, 84, 85, 47; 360/15, 13, 74.4, 72.2, 61, 63, 74.1, 137

[56] References Cited

U.S. PATENT DOCUMENTS

| | | | |
|---|---|---|---|
| 4,280,159 | 7/1981 | Nakayama | 360/137 |
| 4,479,159 | 10/1984 | Kamei et al. | 360/137 |
| 4,644,436 | 2/1987 | Unno | 360/137 |

FOREIGN PATENT DOCUMENTS

61-222081 10/1986 Japan .
61-283089 12/1986 Japan .
62-134856 6/1987 Japan .

Primary Examiner—Hoa Nguyen
Attorney, Agent, or Firm—Wenderoth, Lind & Ponack

[57] ABSTRACT

A device is for specifying and calculating a reproduction time of an optical disk player such that the reproduction time is specified and calculated to coincide with a recording length of one side of a magnetic tape. The optical disk player reproduces audio information stored on an optical disk in the form of a plurality of recorded audio segments. The magnetic tape is used to record at least one of the plurality of recorded audio segments reproduced by the optical disk player. A recording length specifying unit specifies a recording length of the magnetic tape, a display unit displays the recording length specified by the recording length specifying unit, a reproduction time calculating unit calculates the recording length of one side of the magnetic tape by multiplying the recording length specified by the recording length specifying unit by one-half, and an audio segment determining unit determines and selects a number of the plurality of recorded audio segments which can be reproduced within the recording length of the one side of the magnetic tape, and stores an identification of the number of plurality of recorded audio segments thus selected.

5 Claims, 8 Drawing Sheets

DEVICE FOR SPECIFYING AND CALCULATING A PLAY TIME OF AN OPTICAL DISK PLAYER

CROSS REFERENCE TO RELATED APPLICATION

This application is a continuation of application Ser. No. 07/128,912, filed Dec. 4, 1987, and now abandoned.

BACKGROUND OF THE INVENTION

The use of optical disk reproducing apparatuses, such as compact disk players, has increased greatly in recent years.

Generally, recorded on the optical disk are various types of recorded information, such as a plurality of record music segments and index information, including the playing time associated with the recorded information.

In an optical disk reproducing apparatus, it has been a practice to utilize the index information, such as the playing time, to copy information, such as music, onto a magnetic tape by combining an arbitrary program reproduction and a tape recorder.

Conventionally, an optical disk reproducing apparatus of this type is configured as shown in FIG. 5 through FIG. 7.

As shown in FIG. 5, reference number 1 denotes a signal detecting unit having a light pickup device or the like for reading music information or playing time information recorded on an optical disk. Reference number 2 denotes a signal output unit for processing the information read by the signal detecting unit 1, and for converting and outputting the processed information as an audio signal. Reference numeral 3 denotes a control unit for controlling at least the signal detecting unit 1 and the signal output 2. Reference numeral 4 denotes a display unit for displaying via the control unit 3 the information regarding the playing time read by the signal detecting unit 1. Reference numeral 5 denotes a key switch unit having, as shown in FIG. 6, a play key 5a for causing the control unit 3 to start playing, a reproduction time specifying key 5b for inputting arbitrary reproduction time into the control unit 3, and an arbitrary time input key 5c. (Reference numeral 101 of FIG. 6 denotes an optical disc loading tray.) Reference number 6 denotes a portion of the control unit 3 which is a reproduced music operation unit for, within a specified reproduction time inputted by using the reproduction time specifying key 5b and the arbitrary time input key 5c, calculating and storing portions of the recorded music of the optical disk.

Further, a control as shown in the flowchart of FIG. 7 is effected in the above configuration.

In step 1, a determination is made as to whether the play key 5a is depressed, and if it is not depressed, the control proceeds to step 2, and if it is depressed, the control proceeds to step 4. In step 2, a determination is made as to whether a reproduction time has been inputted via the reproduction time specifying key 5b and the arbitrary time input key 5c. If a reproduction time has been specified by these keys, the control proceeds to step 3, and if a reproduction time has not been specified by these keys, the control returns to step 1. In step 3, a number of recorded music segments specified in a disk which can be produced within the specified reproduction time is calculated and an identification number of each of these recorded music segments is stored. The control then returns to step 1. In step 4, the music stored during step 3 is displayed and the control proceeds to step 5. In step 5, a determination is made as to whether all of the stored music segments have been played, and if they have not all been played, the control returns to step 4, and if they have been played, playing has ended, and the control returns to step 1. If the reproduction time has not been specified when the control proceeds to step 4, all of the recorded music segments of the optical disk are played until playing is ended.

However, in the conventional configuration as described above, when recording on a magnetic tape from the optical disk, the tape length of the magnetic tape had to be halved in order to calculate the time duration of one side of the tape before inputting the reproduction time., Further, in order to input such a reproduction time, it was necessary to repeat time consuming operations many times over, wherein the depressed number key which corresponds to the reproduction time is selected from the key switches.

BRIEF SUMMARY OF THE INVENTION

In order to solve the conventional problems set forth as above, the present invention provides an optical disk reproducing apparatus, wherein if a tape length is specified, it becomes possible to perform the calculation to halve the tape length within the apparatus and to input a certain specified tape length using one key switch.

The present invention includes a fixed time storage unit for storing a preselected fixed time, an arbitrary time input unit for inputting an arbitrary time into a control unit, a tape length specifying for providing the control unit with the length of a magnetic recording tape used to record information stored on the optical disk in accordance with the fixed time storage unit and arbitrary time input unit, a display unit for displaying the tape length specified by the tape length specifying unit, a specified reproduction time division unit to calculate half the length of the specified tape length, and a reproduced music operation unit for calculating and selecting the number of musical segments of the optical disk that can be reproduced within the reproduction time obtained by the division unit and for storing the identification number of each of the selected musical segments.

The effects of the configuration according to the present invention include the following.

The fixed time is specified and provided to the control unit by the tape length specifying unit, and the time duration of one side of a tape is obtained by halving the reproduction time specified by the specified reproduction time division unit. The number of recorded music segments of the optical disk that can be reproduced within the time duration of one side of the tape is determined by the reproduced music operation unit. The identification numbers of each of the recorded music segments is stored, thereby making it possible to easily input the reproduction time.

DETAILED DESCRIPTION OF THE INVENTION

Figure 1:
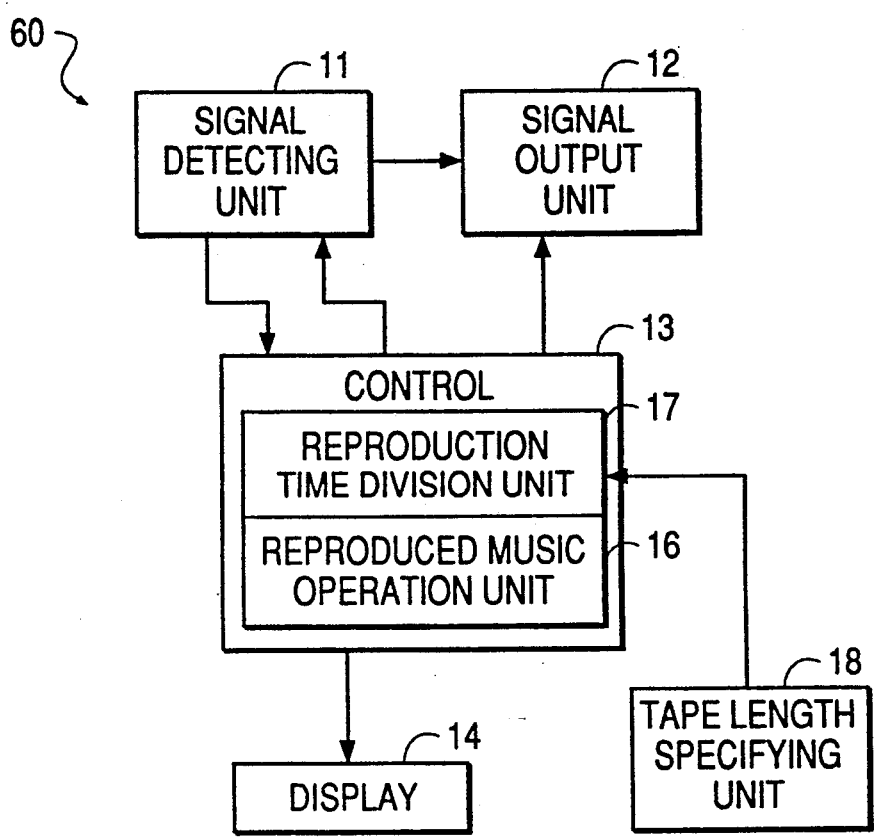
FIG. 1 is a block diagram of an embodiment of an optical disk reproducing apparatus according to the present invention.
Figure 2:
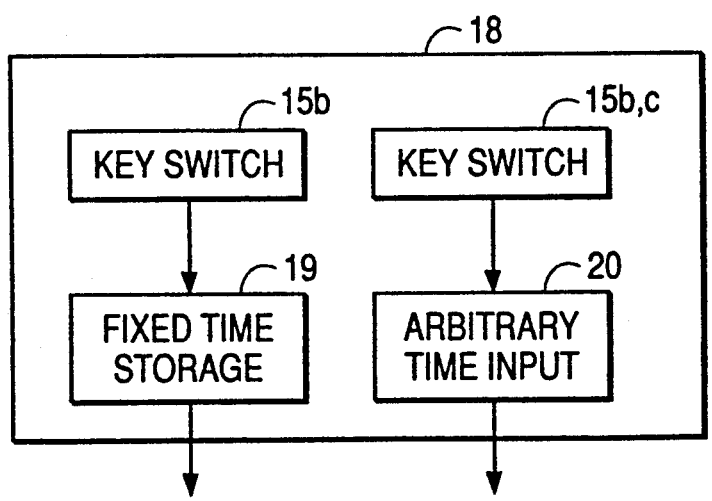
FIG. 2 is a block diagram of the tape length specifying unit of the embodiment shown in FIG. 1.
Figure 3:
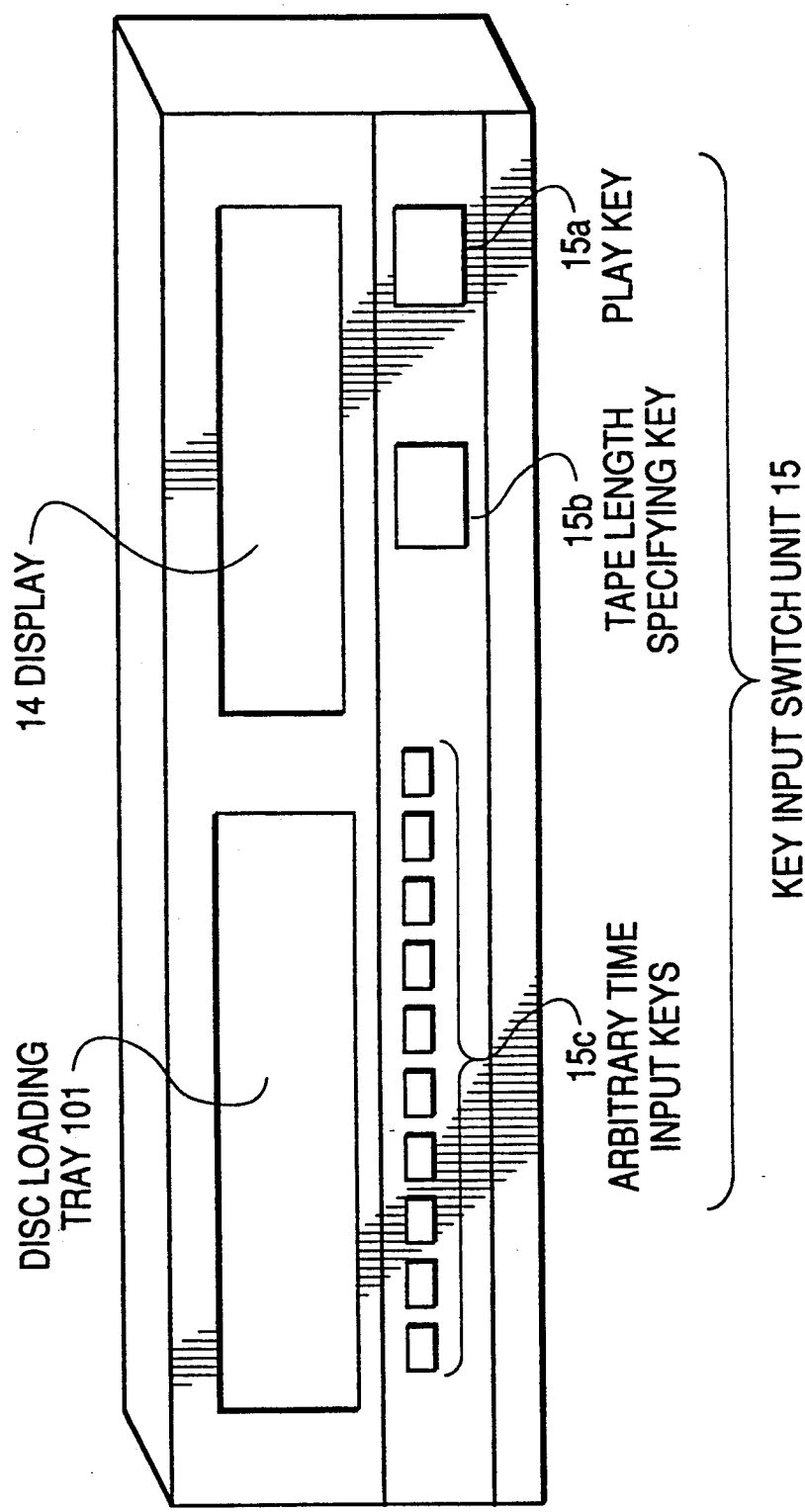
FIG. 3 is a perspective diagram of the appearance of the apparatus shown in FIG. 1.

Embodiments of the present invention will hereafter be described by referring to FIGS. 1, 2, 3, 4(a), 4(b) and 8. As shown in FIG. 1, which depicts the optical disc reproducing apparatus 60 of the invention reference numerals 11 and 12 denote a signal detecting unit and a signal output unit having the same functions as those of the conventional embodiments described above with reference to FIG. 5. Reference number 13 denotes the control unit for controlling at least the signal detecting unit 11 and the signal output unit 12. Reference number 14 denotes the display unit for displaying the playing time and the specified reproduction time and so forth. Reference number 15 denotes the key switch unit including, as shown in FIG. 3, the play key 15a for providing a command to start playing, the tape length specifying key 15b for specifying and providing the control unit with the length of the magnetic recording tape used for recording the reproduced signal of the optical disk, and the arbitrary time input key 15c for inputting an arbitrary time when specifying the tape length. Reference numeral 101 of FIG. 3 denotes an optical disc loading tray. Reference number 17 denotes a portion of the control unit 13 which is a specified reproduction time division unit wherein the time duration of one side of the tape is obtained by halving the reproduction time specified by the tape length specifying unit 18, shown in FIG. 2, in accordance with either the fixed time storage unit 19, which stores preselected fixed time periods of 90 minutes, 60 minutes, and 46 minutes, or the arbitrary time input unit 20 for inputting an arbitrary time into the control unit 13. Reference number 16 denotes another portion of the control unit 13 which is the reproduced music operation unit (i.e. segment determining unit) for calculating and selecting based on disc index information a number of complete recorded music segments that can be reproduced within the time duration of one side of the tape obtained by the specified reproduction time division unit 17, and for storing identification numbers of the thus selected recorded music segments.

Figure 8:
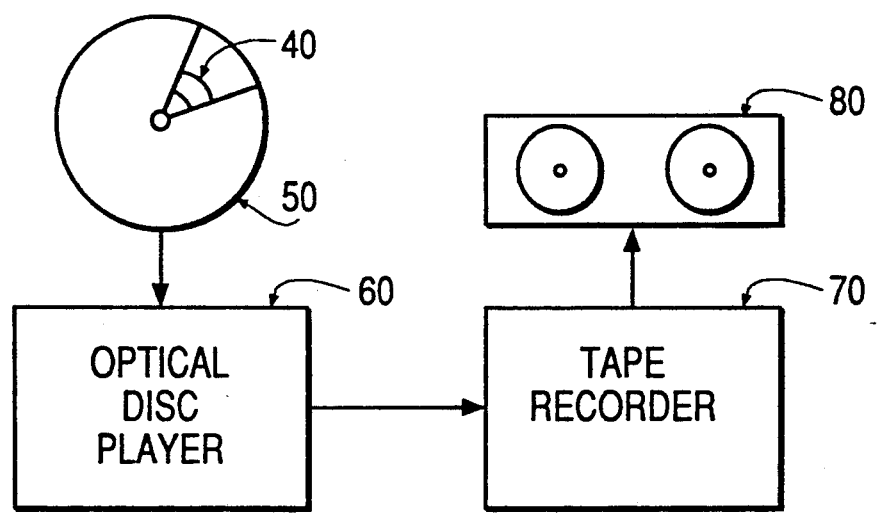
FIG. 8 depicts the operational set-up of the present invention.

FIG. 8 depicts the operational set-up of the present invention. The optical disc player 60 reproduces information stored on an optical disc 50. The information stored on the disc 50 includes recorded segments and index information 40. The reproduction time of the player 60 is established as described herein, and thus selected information is transferred to the magnetic tape 80 via the tape recorder 70.

With respect to the embodiment of the present invention as described above, the operations thereof will now be described by referring to the flowcharts shown in FIG. 4(a) and 4(b).

Figure 4A:
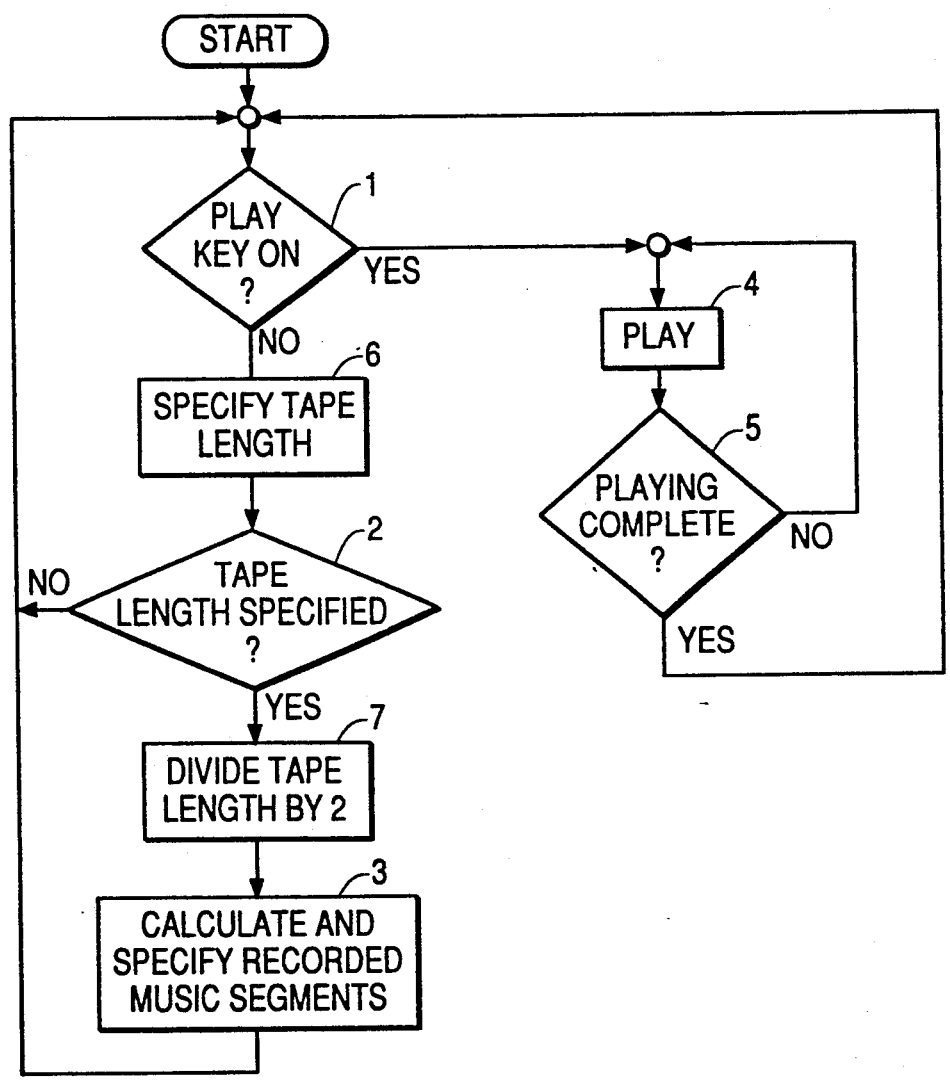
FIG. 4(a) and 4(b) are flowcharts of a tape length specification of the apparatus shown in FIG. 1.
Figure 4B:
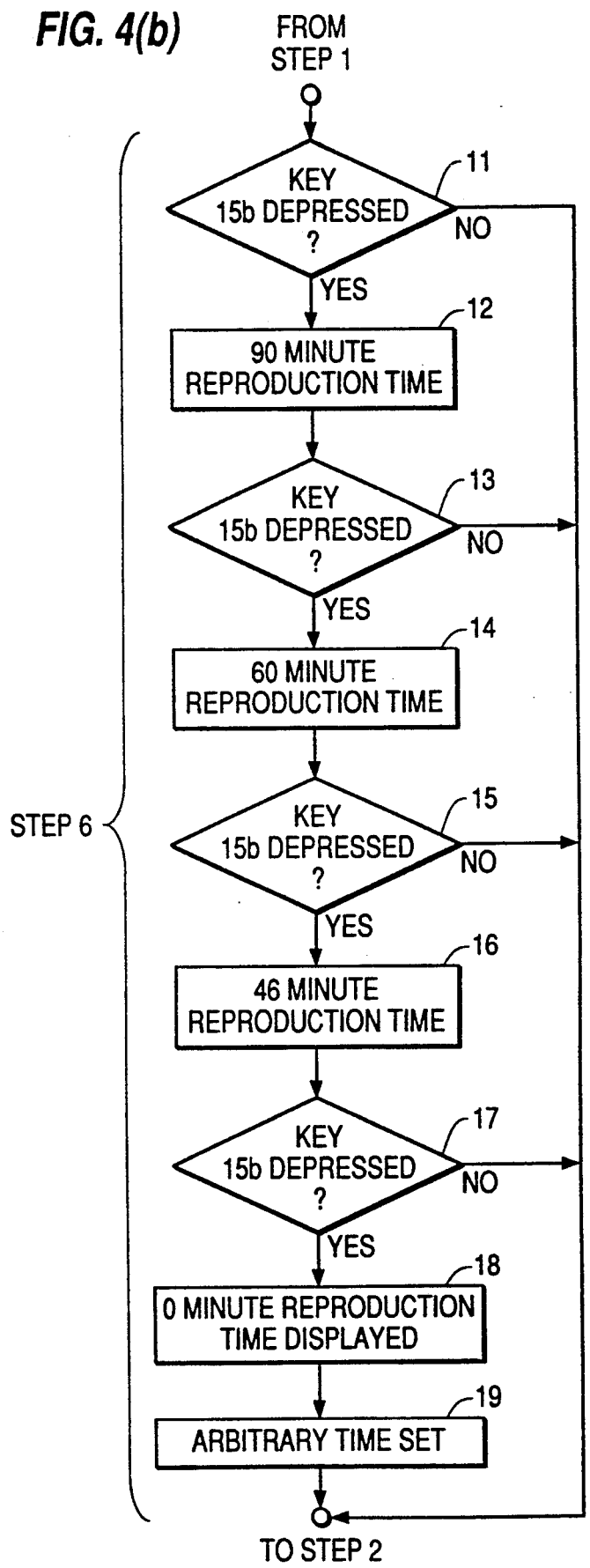
Figure 5:
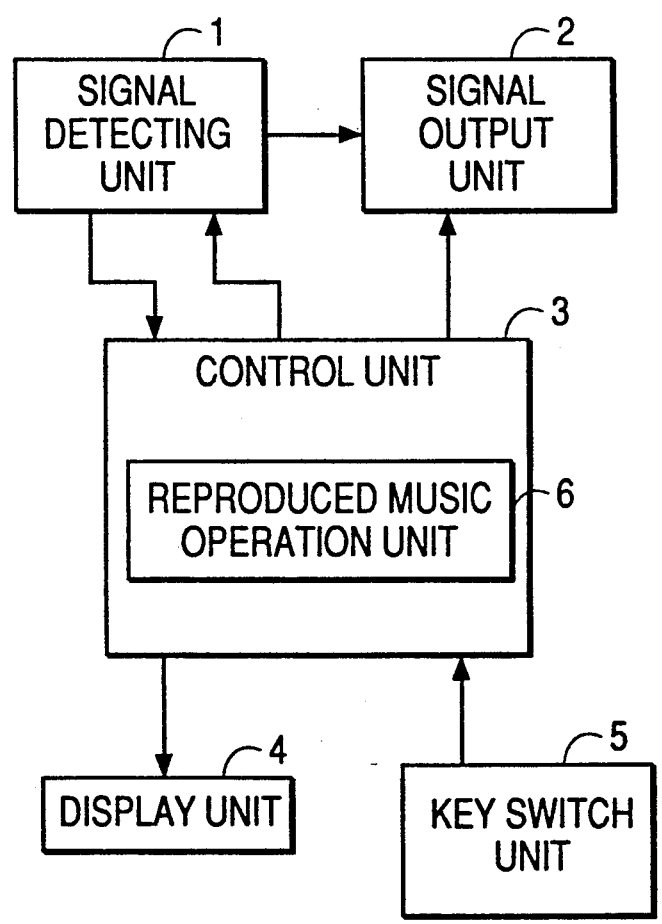
FIG. 5 is a block diagram of a conventional apparatus.
Figure 6:
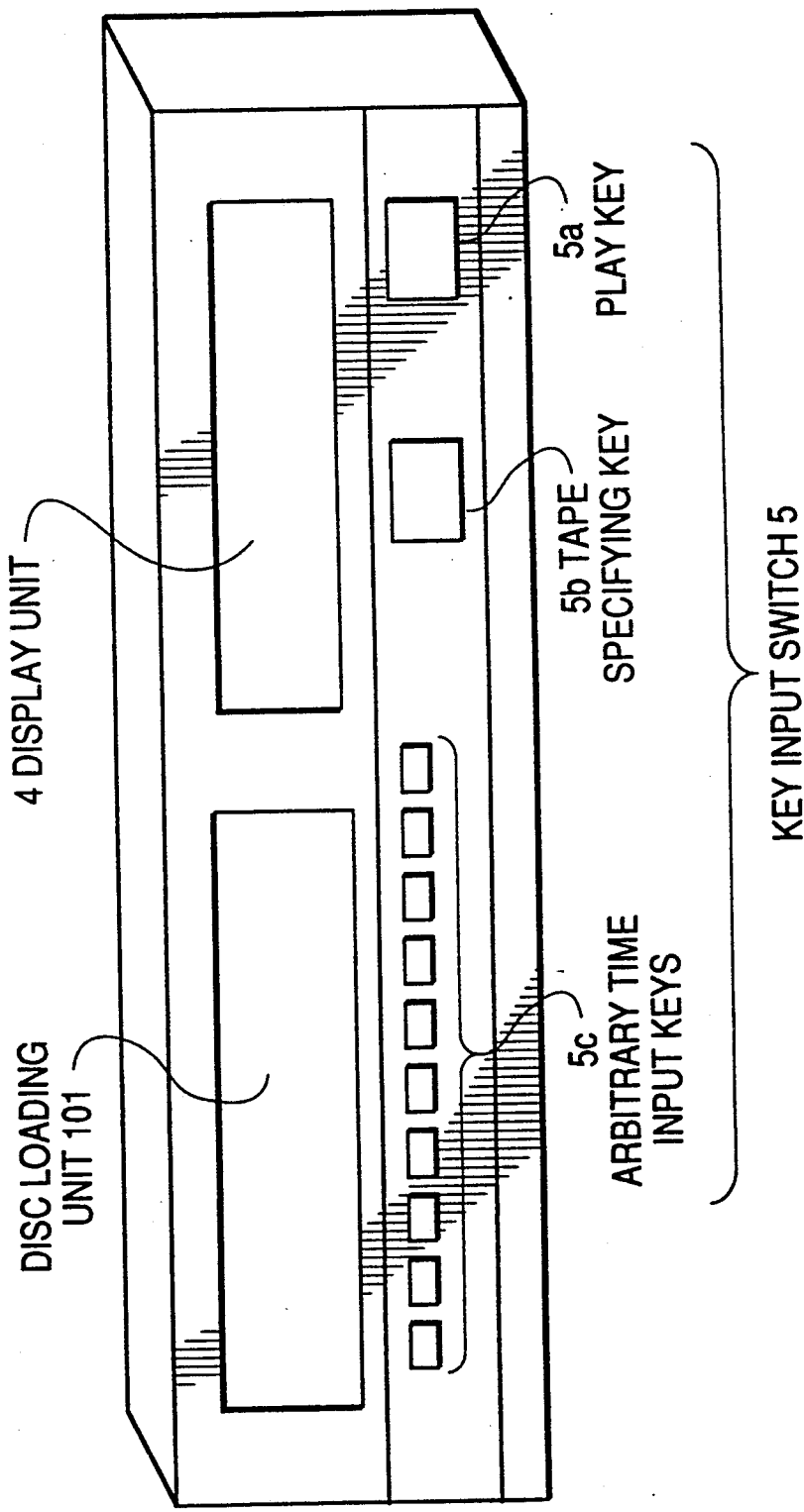
FIG. 6 is a perspective diagram of the appearance of the apparatus shown in FIG. 5.
Figure 7:
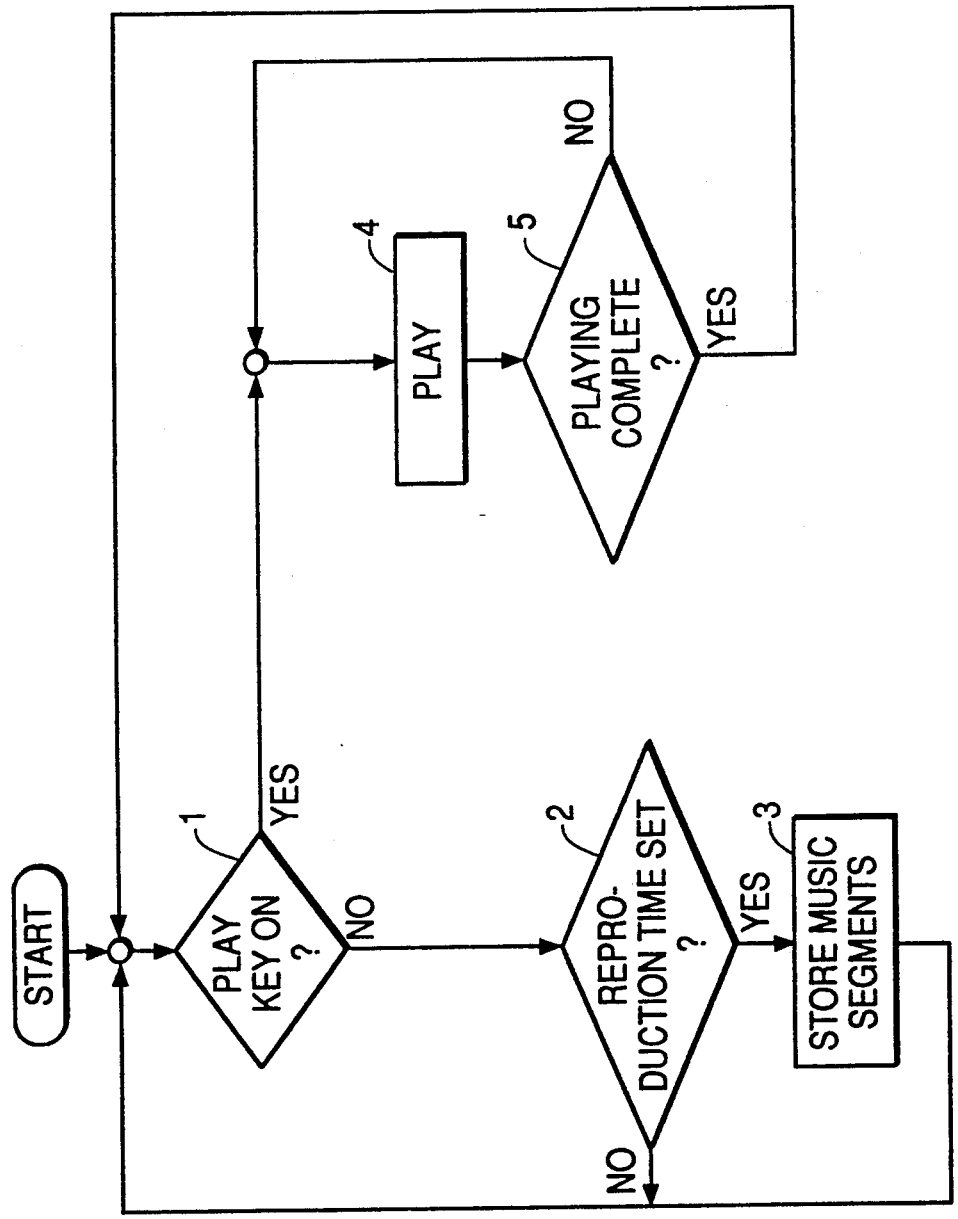
FIG. 7 is a flowchart of the apparatus shown in FIG. 5.

It is first noted that the tape length specifying step 6 shown in FIG. 4(a) consists of steps 11 to 19 shown in FIG. 4(b).

As shown in FIG. 4(a), step 1, step 4, and step 5, represent the same operations as those of the conventional embodiments and the descriptions thereof are therefore omitted. In step 6, as shown in FIG. 4(b), the tape specifying key 15b and the arbitrary time input key 15c specify the length of the magnetic recording tape before the control proceeds to step 2. As shown in FIG. 4(b), a determination is made in step 11 as to whether the tape length specifying key 15b has been depressed, and if it has been depressed, the control proceeds to step 12, and if it has not been depressed, then the control proceeds to step 2. In step 12, the display unit 14 displays a time information of 90 minutes which is stored in the fixed time storage unit 19 to establish the specified reproduction time at 90 minutes, and the control proceeds to step 13. In step 13 through step 16, the same operations as set forth in steps 11 and 12 are repeated to change the fixed values sequentially from 60 minutes to 46 minutes. In step 17, a determination is again made as to whether the tape length specifying key 15b has been depressed, and if it has been depressed, the control proceeds to step 18, and if it has not been depressed, then the control proceeds to step 2. In step 18, in order to indicate that the arbitrary time specifying mode is selected, 0 minutes is displayed on the display unit 4, and the control proceeds to step 19. In step 19, the arbitrary time input key 15c is used to specify a tape length, and the control proceeds to step 2. In step 2, a determination is made as to whether a tape length has been specified in step 6, and if it has been specified, the control proceeds to step 7, and if it has not been specified, then the control returns to step 1. In step 7, a time period equal to half the time specified in step 6 is calculated by the specified reproduction time division unit 17 and displayed on the display unit 4, and the control proceeds to step 3. In step 3, the number of recorded music segments of the optical disk which can be reproduced within the time duration of one side of the tape is calculated, the identification numbers of each specified recorded music segment is stored, and the control returns to step 1.

As stated above, according to the embodiment of the present invention, it is possible to specify using a single switch tape lengths of 90 minutes, 60 minutes, and 46 minutes, which represent the most popular compact cassette tape lengths. The process of calculating one half the specified tape length is effected within the apparatus, thereby eliminating the necessity for the operator to calculate the time duration of one side of the tape.

In the above embodiment, the tape length specifying unit includes both the fixed time storage unit and the arbitrary time input unit. However, the present invention may be equipped with either the fixed time storage unit or with the arbitrary time input unit, and/or otherwise equipped with a reproduced music operation unit which can specify the recorded music segments to be reproduced in any sequence.

As is apparent from the above embodiment, an optical disk reproducing apparatus according to the present invention includes a fixed time storage unit for storing a plurality of preselected fixed times, an arbitrary time input unit for inputting an arbitrary time rather than a preselected fixed time, a tape length specifying unit for providing to the control unit the length of the magnetic tape used for recording from the optical disk in accordance with the fixed time storage unit and the arbitrary time input unit, a display unit for displaying the tape length specified by the tape length specifying unit, a specified reproduction time division unit for calculating one half the length of the specified tape, and a reproduced music operation unit for calculating the number of recorded music segments of the optical disk that can be reproduced within a reproduction time obtained by the division unit and for storing the identification numbers of each of the recorded music segments, to thereby remove the necessity of calculating the time duration of one side of the cassette tape used for recording, thereby facilitating the tape length entry into the optical disk device.

What is claimed is:

1. A device for specifying and calculating a reproduction time of an optical disk player such that the reproduction time is specified and calculated to coincide with a recording length of one side of a magnetic tape, the optical disk player reproducing information stored on an optical disk, the information being stored in the form of a plurality of recorded segments and including index information regarding the plurality of recorded segments, at least one of the plurality of recorded segments reproduced by the optical disk player being recorded on said magnetic tape by a tape recorder, said device comprising:

a recording length specifying means for specifying a recording length of the magnetic tape;

a display means, coupled to said recording length specifying means, for displaying said recording length specified by said recording length specifying means;

a reproduction time calculating means, coupled to said recording length specifying means, for calculating the recording length of one side of the magnetic tape by multiplying the recording length specified by the recording length specifying means by one-half; and a segment determining means, coupled to the reproduction time calculating means and said optical disk player, for determining and selecting based on the index information, a number of the plurality of recorded segments which can be reproduced within the recording length of the one side of the magnetic tape, and for storing an identification of said number of plurality of recorded segments thus selected.

2. A device as recited in claim 1, wherein said recording length specifying means includes a fixed time storage unit having stored therein a plurality of preselected fixed time durations, and further including a fixed recording length specifying means for selecting one of said plurality of fixed time durations stored in said fixed time storage unit as recording length of the magnetic tape.

3. The device as recited in claim 2, wherein said plurality of fixed time durations includes at least one of 90 minutes and 60 minutes and 46 minutes.

4. The device as recited in claim 1, wherein said recording length specifying means includes:

a fixed time storage unit for storing a plurality of fixed time durations;

a fixed recording length specifying means for selected one of said plurality of fixed time durations stored in said fixed time storage unit;

an arbitrary time input means for inputting an arbitrary time; and an arbitrary time length specifying means for specifying an arbitrary recording length via said arbitrary time input means;

wherein said recording length is specified according to one of said plurality of fixed time durations and said arbitrary recording length.

5. The apparatus as recited in claim 4, wherein said plurality of fixed time durations includes at least one of 90 minutes and 60 minutes and 46 minutes.

* * * * *